United States Patent
Astvatsaturov et al.

(10) Patent No.: US 12,475,342 B2
(45) Date of Patent: Nov. 18, 2025

(54) SYSTEMS AND METHODS FOR CHANGING AN AIMER BLINK PATTERN RESPONSIVE TO A DECODE EVENT

(71) Applicant: ZEBRA TECHNOLOGIES CORPORATION, Lincolnshire, IL (US)

(72) Inventors: Yuri Astvatsaturov, Lake Forest, IL (US); Darran Michael Handshaw, Sound Beach, NY (US); Patrick Mauro, Lake Grove, NY (US); Christopher W. Brock, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 82 days.

(21) Appl. No.: 18/227,737

(22) Filed: Jul. 28, 2023

(65) Prior Publication Data

US 2025/0036897 A1    Jan. 30, 2025

(51) Int. Cl.
  *G06K 7/10* (2006.01)
  *G06K 7/14* (2006.01)

(52) U.S. Cl.
  CPC ...... *G06K 7/10732* (2013.01); *G06K 7/10811* (2013.01); *G06K 7/10881* (2013.01); *G06K 7/1447* (2013.01)

(58) Field of Classification Search
  None
  See application file for complete search history.

(56) References Cited

U.S. PATENT DOCUMENTS

| | | | |
|---|---|---|---|
| 4,496,831 A | 1/1985 | Swartz et al. |
| 5,010,241 A | 4/1991 | Butterworth |
| 5,587,704 A | 12/1996 | Foster |
| 5,675,139 A | 10/1997 | Fama |
| 5,745,794 A | 4/1998 | Poloniewicz et al. |
| 5,821,518 A | 10/1998 | Sussmeier et al. |
| 5,825,011 A | 10/1998 | Suzuki et al. |
| 5,945,670 A | 8/1999 | Rudeen |
| 5,959,282 A | 9/1999 | Tabuchi |
| 5,969,321 A | 10/1999 | Danielson et al. |
| 6,000,617 A | 12/1999 | Swartz et al. |
| 6,123,263 A | 9/2000 | Feng |
| 6,158,662 A | 12/2000 | Kahn et al. |

(Continued)

*Primary Examiner* — Thien M Le
*Assistant Examiner* — April A Taylor
(74) *Attorney, Agent, or Firm* — Yuri Astvatsaturov

(57) ABSTRACT

Imaging devices, systems, and methods for capturing image data for an object appearing in a field of view (FOV) are described herein. An example device includes: an imaging assembly; an aiming assembly; and a computer-readable media storing machine readable instructions that cause the imaging device to: (i) initiate a first aiming state responsive to receiving an indication of a trigger event; (ii) capture the image data of the object appearing in the FOV while operating in the first aiming state; (iii) transition from the first aiming state to a second aiming state responsive to a successful decode event associated with the indicia, wherein the light source is to emit light in the second aiming state such that an observable appearance is different in the second aiming state than in the first aiming state; and (iv) otherwise refrain from transitioning from the first aiming state to the second aiming state.

24 Claims, 9 Drawing Sheets

(56) References Cited

U.S. PATENT DOCUMENTS

| | | |
|---|---|---|
| 6,164,545 A | 12/2000 | Danielson |
| 6,206,286 B1 | 3/2001 | Watanabe et al. |
| 6,340,119 B2 | 1/2002 | He et al. |
| 6,669,093 B1 | 12/2003 | Meyerson et al. |
| 6,708,883 B2 | 3/2004 | Krichever et al. |
| 6,758,403 B1 | 7/2004 | Keys et al. |
| 6,766,954 B2 | 7/2004 | Barkan et al. |
| 6,942,151 B2 | 9/2005 | Ehrhart |
| 6,959,871 B1 | 11/2005 | Herrod et al. |
| 7,090,134 B2 | 8/2006 | Ramsager |
| 7,090,137 B1 | 8/2006 | Bennett |
| 7,261,238 B1 | 8/2007 | Carlson et al. |
| 7,264,166 B2 | 9/2007 | Barkan |
| 7,331,524 B2 | 2/2008 | Vinogradov et al. |
| 7,347,371 B2 | 3/2008 | Joseph et al. |
| 7,387,246 B2 | 6/2008 | Palestini et al. |
| 7,392,951 B2 | 7/2008 | Ray et al. |
| 7,407,096 B2 | 8/2008 | McQueen et al. |
| 7,428,991 B2 | 9/2008 | Joseph et al. |
| 7,478,753 B2 | 1/2009 | Patel et al. |
| 7,494,065 B2 | 2/2009 | Barkan et al. |
| 7,559,473 B2 | 7/2009 | He |
| 7,686,223 B2 | 3/2010 | Vinogradov et al. |
| 7,726,572 B2 | 6/2010 | He et al. |
| 7,798,408 B2 | 9/2010 | Blumer et al. |
| 7,878,405 B2 | 2/2011 | Kricorissian |
| 7,878,406 B2 | 2/2011 | Pankow |
| 7,967,205 B2 | 6/2011 | Pankow et al. |
| 8,006,906 B2 | 8/2011 | Liu et al. |
| 8,025,234 B2 | 9/2011 | Brock |
| 8,087,587 B2 | 1/2012 | Vinogradov et al. |
| 8,181,878 B2 | 5/2012 | Nunnink et al. |
| 8,282,005 B2 | 10/2012 | Cudzilo |
| 8,368,007 B2 | 2/2013 | Handshaw et al. |
| 8,500,024 B2 | 8/2013 | He |
| 8,561,903 B2 | 10/2013 | Sauerwein, Jr. |
| 8,571,298 B2 | 10/2013 | McQueen et al. |
| 8,608,071 B2 | 12/2013 | Liu et al. |
| 8,625,880 B2 | 1/2014 | Silver et al. |
| 8,628,013 B2 | 1/2014 | Ding |
| 8,646,689 B2 | 2/2014 | Moed et al. |
| 8,733,643 B2 | 5/2014 | Svetal et al. |
| 8,744,977 B2 | 6/2014 | Amling et al. |
| 8,774,453 B2 | 7/2014 | Soderberg et al. |
| 8,783,573 B2 | 7/2014 | Havens et al. |
| 8,789,758 B2 | 7/2014 | Hawley et al. |
| 8,910,873 B2 | 12/2014 | Drzymala et al. |
| 8,939,369 B2 | 1/2015 | Olmstead et al. |
| 8,950,676 B2 | 2/2015 | Trajkovic et al. |
| 9,010,643 B2 | 4/2015 | Madej et al. |
| 9,111,163 B2 | 8/2015 | He |
| 9,158,953 B2 | 10/2015 | Gillet et al. |
| 9,224,023 B2 | 12/2015 | Havens et al. |
| 9,256,772 B2 | 2/2016 | Yeakley et al. |
| 9,268,979 B2 | 2/2016 | Thompson et al. |
| 9,292,724 B1 | 3/2016 | Flïgge et al. |
| 9,378,397 B2 | 6/2016 | Cherry et al. |
| 9,501,678 B2 | 11/2016 | Lu et al. |
| 9,613,244 B2 | 4/2017 | Santi et al. |
| 9,659,199 B2 | 5/2017 | Van Volkinburg et al. |
| 9,852,321 B2 | 12/2017 | Canini et al. |
| 10,055,625 B2 | 8/2018 | Feng et al. |
| 10,120,675 B2 | 11/2018 | Pettinelli, Jr. et al. |
| 10,198,647 B2 | 2/2019 | Canini et al. |
| 10,210,367 B1 | 2/2019 | Quattrini et al. |
| 10,242,017 B2 | 3/2019 | Berthiaume et al. |
| 10,268,853 B2 | 4/2019 | Nagata et al. |
| RE47,608 E | 9/2019 | Koch |
| 10,430,776 B2 | 10/2019 | Svetal |
| 10,671,824 B2 | 6/2020 | Chen et al. |
| 10,726,225 B2 * | 7/2020 | Albanese ........... G06K 7/10386 |
| 10,754,122 B2 | 8/2020 | Flugge et al. |
| 10,762,318 B2 | 9/2020 | D'Ercoli et al. |
| 10,817,689 B2 | 10/2020 | Mazzone |
| 10,902,234 B2 | 1/2021 | Feng et al. |
| 11,090,689 B2 | 8/2021 | Gil |
| 11,115,566 B2 | 9/2021 | Nunnink et al. |
| 11,210,485 B2 | 12/2021 | Brock |
| 11,321,545 B2 | 5/2022 | Spolzino et al. |
| 11,327,387 B2 | 5/2022 | Nunnink et al. |
| 11,334,964 B2 | 5/2022 | Vinogradov et al. |
| 11,455,482 B2 | 9/2022 | Ye et al. |
| 11,665,432 B2 | 5/2023 | Germaine et al. |
| 11,679,451 B2 | 6/2023 | Bassi |
| 11,699,050 B1 * | 7/2023 | Fortino ................. G06F 3/0484 |
| | | 235/472.01 |
| 11,704,512 B2 | 7/2023 | Astvatsaturov |
| 2003/0089775 A1 | 5/2003 | Yeakley et al. |
| 2005/0274806 A1 | 12/2005 | Dant |
| 2007/0228176 A1 | 10/2007 | Vinogradov et al. |
| 2009/0127342 A1 | 5/2009 | Giebel et al. |
| 2010/0051696 A1 | 3/2010 | Liu et al. |
| 2010/0163624 A1 | 7/2010 | Hosoi et al. |
| 2011/0089244 A1 | 4/2011 | Barkan et al. |
| 2012/0181338 A1 * | 7/2012 | Gao .......................... G06K 7/12 |
| | | 235/455 |
| 2012/0318860 A1 * | 12/2012 | Anderson ................ G06K 7/12 |
| | | 235/375 |
| 2013/0228625 A1 | 9/2013 | Sharma et al. |
| 2018/0053027 A1 * | 2/2018 | Todeschini ....... G06K 19/06028 |
| 2020/0042756 A1 * | 2/2020 | Albanese ........... G06K 7/10386 |
| 2020/0327290 A1 * | 10/2020 | Ohori ................. G06K 7/10811 |
| 2021/0142019 A1 | 5/2021 | Astvatsaturov |
| 2022/0249316 A1 * | 8/2022 | Border ...................... G06T 5/73 |
| 2023/0114004 A1 | 4/2023 | Gurevich et al. |
| 2023/0124084 A1 | 4/2023 | Handshaw et al. |
| 2023/0156346 A1 | 5/2023 | Giordano et al. |
| 2023/0214615 A1 | 7/2023 | Regard et al. |
| 2023/0222304 A1 | 7/2023 | Wang et al. |

* cited by examiner

SYSTEMS AND METHODS FOR CHANGING AN AIMER BLINK PATTERN RESPONSIVE TO A DECODE EVENT

BACKGROUND

Barcode reading systems have long been used to capture barcode data, which is then used to look up information regarding the item in question. However, traditional systems may not clearly notify a user when such a scan event is successful. As such, an unwary user may scan an item multiple times or may neglect to scan some items. Traditional systems attempt to address such concerns by generating an auditory cue for a user, but such cues may go unnoticed in busy or loud environments or by those who are hard of hearing. Other traditional attempts to address such concerns use a separate system of lights and/or a light for illuminating objects in a field of view to indicate a successful scan to a user. However, such attempts may drain excessive quantities of power, require a larger device footprint, and/or be too diffuse to see in some lighting. As such, a system that is able detect when a successful scan occurs and provide a clear and visible indication of such to a user is desired.

SUMMARY

In an embodiment, an imaging device is provided. The imaging device includes: an imaging assembly configured to capture image data of an object appearing in a field of view (FOV) and an aiming assembly including a light source configured to emit light with a wavelength in a range of 495 nanometers to 565 nanometers. The system further includes a computer-readable media storing machine readable instructions that, when executed, cause the imaging device to: (i) initiate, at the aiming assembly, a first aiming state responsive to receiving an indication of a trigger event; (ii) capture, via the imaging assembly, the image data of the object appearing in the FOV while operating in the first aiming state, wherein the image data of the object is representative of an environment appearing in the FOV and includes data associated with an indicia present in the FOV; (iii) transition, at the aiming assembly, from the first aiming state to a second aiming state responsive to a successful decode event associated with the indicia, wherein the light source is to emit light in the second aiming state such that an observable appearance of the light in the FOV is different in the second aiming state than in the first aiming state; and (iv) otherwise refrain from transitioning, at the aiming assembly, from the first aiming state to the second aiming state.

In a variation of this embodiment, the computer-readable media further stores additional instructions that, when executed, cause the imaging device to: transition, at the aiming assembly, to an inactive aiming state after a timeout event.

In another variation of the embodiment, the image data of the object is object image data, the indicia is an object indicia representative of the object, and the computer-readable media further stores additional instructions that, when executed, cause the imaging device to: capture, via the imaging assembly, parameter image data including a parameter indicia; decode the parameter indicia; and modify one or more operation parameters of the light source during the second aiming state based on the parameter indicia.

In another variation of the embodiment, the one or more operation parameters of the light source includes at least one of: (i) a flash pattern type; (ii) a duty cycle length; (iii) a brightness of the light source; (iv) a flash pattern duration; or (v) a color of the light emitted by the light source.

In another variation of the embodiment, transitioning from the first aiming state to the second aiming state includes: maintaining at least a consistent color and aim pattern between the first aiming state and the second aiming state.

In yet another variation of the embodiment, the image data of the object is first image data, the indicia is a first indicia, the successful decode event is a first successful decode event, and the computer-readable media further stores additional instructions that, when executed, cause the imaging system to: capture, via the imaging assembly, second image data including data associated with a second indicia present in the FOV; and transition, at the aiming assembly, to a third aiming state responsive to a second successful decode event associated with the second indicia, wherein the light source is to emit light in the third aiming state such that an observable appearance of the light in the FOV is different in the third aiming state than in the second aiming state and the first aiming state.

In still yet another variation of the embodiment, the indicia is a first indicia, the successful decode event is a first successful decode event, the image data includes data associated with a second indicia present in the FOV, and the computer-readable media further stores additional instructions that, when executed, cause the imaging system to: transition, at the aiming assembly, to a third aiming state responsive to a second successful decode event associated with the second indicia occurring within a predetermined time period of the first successful decode event, wherein the light source is to emit light in the third aiming state such that an observable appearance of the light in the FOV is different in the third aiming state than in the second aiming state and the first aiming state.

In another variation of the embodiment, the successful decode event is a first successful decode event, and the computer-readable media further stores additional instructions that, when executed, cause the imaging system to: transition, at the aiming assembly, to a third aiming state responsive to a second successful decode event associated with the second indicia occurring within a predetermined time period of the first successful decode event, wherein the light source is to emit light in the third aiming state such that an observable appearance of the light in the FOV is different in the third aiming state than in the second aiming state and the first aiming state.

In yet another variation, the computer-readable media further stores additional instructions that, when executed, cause the imaging system to: transition, at the aiming assembly, to a third aiming state when at least one of: (i) the successful decode event occurs and a communication error occurs, (ii) the indicia is within a predetermined range of a focus limit, (iii) the indicia is not centered in the FOV, (iv) the time to decode exceeds a predetermined threshold, (v) the indicia is held in a predetermined location of the FOV, or (vi) the indicia is held outside of the predetermined location of the FOV, wherein the light source is to emit light in the third aiming state such that an observable appearance of the light in the FOV is different in the third aiming state than in the second aiming state and the first aiming state.

In yet another variation, the computer-readable media further stores additional instructions that, when executed, cause the imaging system to: transition, at the aiming assembly, from the second aiming state to the first aiming state after a timeout event occurs.

In still yet another variation, the transition to the inactive aiming state includes a transition from the second aiming state to the inactive aiming state.

In another variation, the light source is configured to emit light with a wavelength in a range of 515 nanometers to 525 nanometers.

In yet another variation, the computer-readable media further stores additional instructions that, when executed, cause the imaging system to: provide haptic feedback at a frequency matching a change in duty cycle of the light source of the aiming assembly while in the second aiming state.

In another embodiment, a method for managing aiming states of an imaging device is provided. The method includes: (i) initiating, at an aiming assembly including a light source configured to emit light with a wavelength in a range of 495 nanometers to 565 nanometers, a first aiming state responsive to receiving an indication of a trigger event; capturing, via an imaging assembly configured to capture image data of an object appearing in a field of view (FOV), the image data of the object appearing in the FOV while operating in the first aiming state, wherein the image data of the object is representative of an environment appearing in the FOV and includes data associated with an indicia present in the FOV; transitioning, at the aiming assembly, from the first aiming state to a second aiming state responsive to a successful decode event associated with the indicia, wherein the light source is to emit a consistent light pattern in the first aiming state and an altering light pattern in the second aiming state; otherwise refraining from transitioning, at the aiming assembly, from the first aiming state to the second aiming state.

In a variation of the embodiment, the method further comprises transitioning, at the aiming assembly, to an inactive aiming state after a timeout event.

In another variation of the embodiment, the image data of the object is object image data, the indicia is an object indicia representative of the object, and the method further comprises: capturing, via the imaging assembly, parameter image data including a parameter indicia; decoding the parameter indicia; and modifying one or more operation parameters of the light source during the second aiming state based on the parameter indicia.

In yet another variation of the embodiment, the one or more operation parameters of the light source includes at least one of: (i) a flash pattern type; (ii) a duty cycle length; (iii) a brightness of the light source; (iv) a flash pattern duration; or (v) a color of the light emitted by the light source.

In still another variation of the embodiment, transitioning from the first aiming state to the second aiming state includes: maintaining at least a consistent color and aim pattern between the first aiming state and the second aiming state.

In still yet another variation of the embodiment, the method further comprises transitioning, at the aiming assembly, to a third aiming state when at least one of: (i) the successful decode event occurs and a communication error occurs, (ii) the indicia is within a predetermined range of a focus limit, (iii) the indicia is not centered in the FOV, (iv) the time to decode exceeds a predetermined threshold, (v) the indicia is held in a predetermined location of the FOV, or (vi) the indicia is held outside of the predetermined location of the FOV, wherein the light source is to emit light in the third aiming state such that an observable appearance of the light in the FOV is different in the third aiming state than in the second aiming state and the first aiming state.

In another variation of the embodiment, the method further comprises transitioning, at the aiming assembly, from the second aiming state to the first aiming state after a timeout event occurs.

In yet another variation of the embodiment, the transitioning to the inactive aiming state includes transitioning from the second aiming state to the inactive aiming state.

In still another variation of the embodiment, the light source is configured to emit light with a wavelength in a range of 515 nanometers to 525 nanometers.

In still yet another variation of the embodiment, the method further comprises providing haptic feedback at a frequency matching a change in duty cycle of the light source of the aiming assembly while in the second aiming state.

In another variation of the embodiment, the altering pattern alternates between a first pattern and a second pattern at a frequency of less than or equal to 20 Hz.

In yet another variation of the embodiment, for the first pattern, the light source emits the consistent pattern and, for the second pattern, the light source is inactive.

In still another variation of the embodiment, a duty cycle of the light source during the first aiming state is greater than or equal to 30 Hz.

In still yet another variation of the embodiment, the method further comprises receiving, from a camera system, an indication of whether the transition from the first aiming state to the second aiming state occurred; and determining, based at least on the indication of whether the transition from the first aiming state to the second aiming state occurred, whether a scan avoidance event occurs.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention and explain various principles and advantages of those embodiments.

Figure 1B:
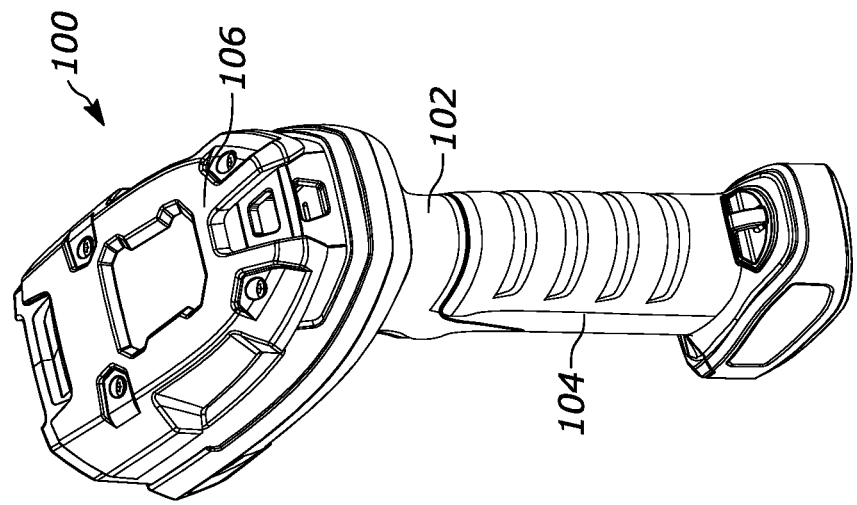
FIG. 1B illustrates a back perspective view of the handheld barcode reader of FIG. 1A.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The example imaging devices disclosed herein utilize an existing assembly in an imaging device in the form of an aiming assembly to provide visible cues to a user to indicate that a successful decode event (or other such event) has occurred by changing aiming states for the aiming assembly. By utilizing the aiming assembly to provide visible cues to the user, the imaging device is able to successfully provide a clear and visible indication of an event occurrence to a user via, what could be configured as, a concentrated and bright light that reduces the likelihood of a user missing the indication. Further, by using the aiming assembly, the imaging device 200 may reduce the complexity or the footprint of the device, as the aiming assembly may satisfy multiple roles without requiring an additional assembly and the subsequently required space for implementing such.

Further, some example imaging devices disclosed herein utilize additional aiming state(s) to indicate additional information to a user. For example, such additional aiming states may include indications that multiple decodes have occurred on a single item, that multiple decodes have occurred in a short period of time, that a decode succeeded but a communication failed, and any other such scenario or event that may rely on visual signaling to an observer.

Figure 1A:
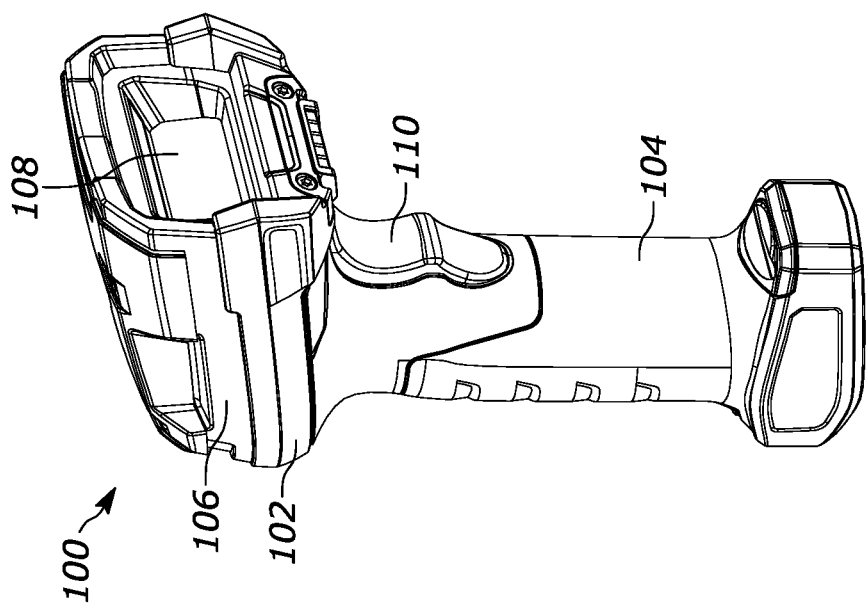
FIG. 1A illustrates a front perspective view of a first example handheld barcode reader.
Figure 1C:
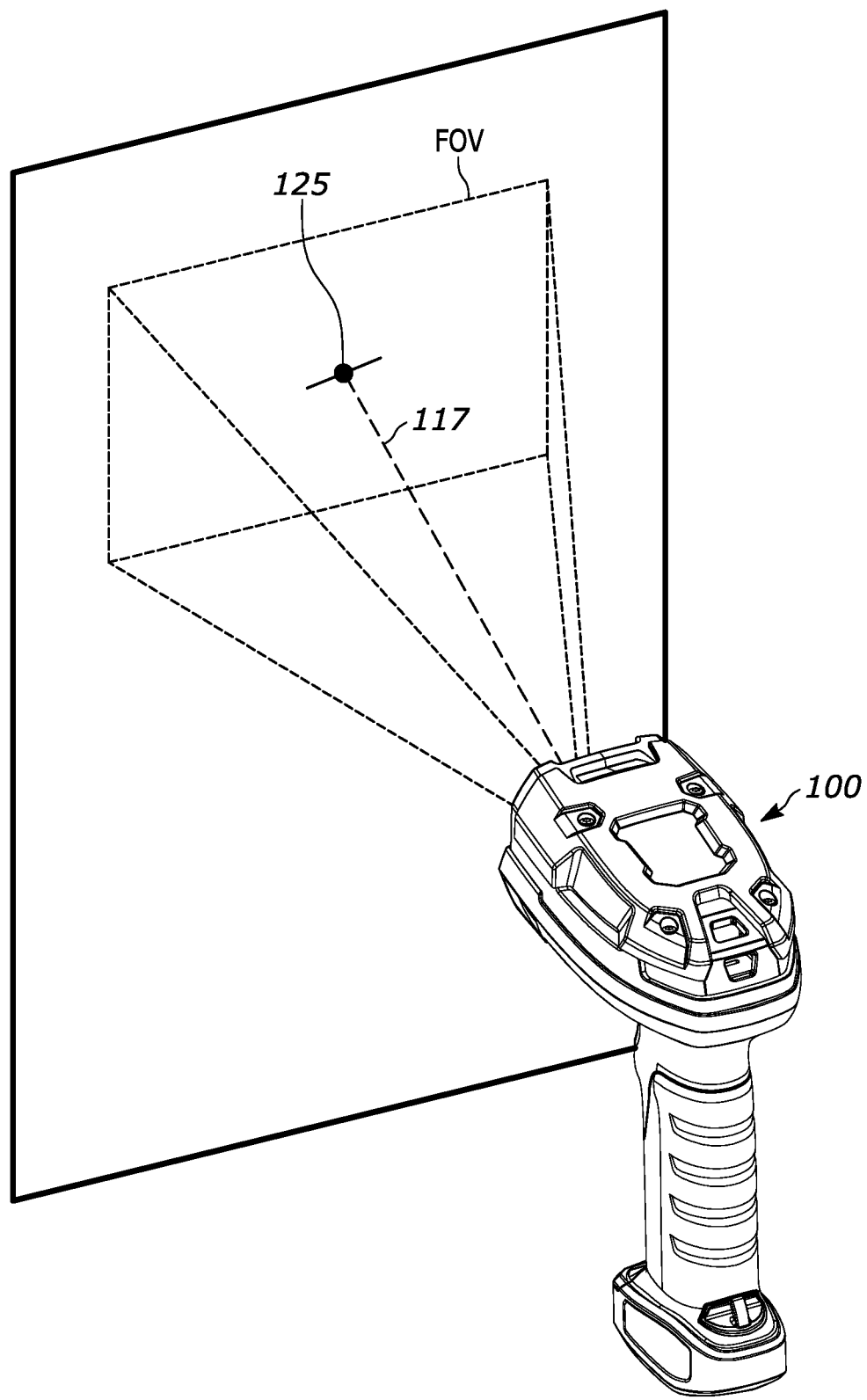
FIG. 1C illustrates a perspective view of the handheld barcode reader of FIG. 1A projecting an aim pattern.

Referring to FIGS. 1A-1C, FIGS. 1A and 1B illustrate an exemplary handheld imaging device 100 having a housing 102 with a handle portion 104, also referred to as a handle 104, and a head portion 106, also referred to as a scanning head 106. The head portion 106 includes a window 108 and is configured to be positioned on the top of the handle portion 104. The handle portion 104 is configured to be gripped by a reader user and includes a trigger 110 for activation by the user. Optionally included in an embodiment is also a base (not shown), also referred to as a base portion, that may be attached to the handle portion 104 opposite the head portion 106, and is configured to stand on a surface and support the housing 102 in a generally upright position. The handheld imaging device 100 can be used in a hands-free mode as a stationary workstation when it is placed on a countertop or other workstation surface. The handheld imaging device 100 can also be used in a handheld mode when it is picked up off the countertop or base station, and held in an operator's hand. In the hands-free mode, products can be slid, swiped past, or presented to the window 108 for the reader to initiate barcode reading operations. In the handheld mode, the barcode reader 100 can be moved towards a barcode on a product, and the trigger 110 can be manually depressed to initiate imaging of the barcode.

Other implementations may provide only handheld or only hands-free configurations. In the embodiment of FIGS. 1A-1C, the handheld imaging device 100 is ergonomically configured for a user's hand, though other configurations may be utilized as understood by those of ordinary skill in the art. As shown, the lower handle 104 extends below and rearwardly away from the body 102 along a centroidal axis obliquely angled relative to a central FOV axis of a FOV of an imaging assembly within the scanning head 102.

Figure 2:
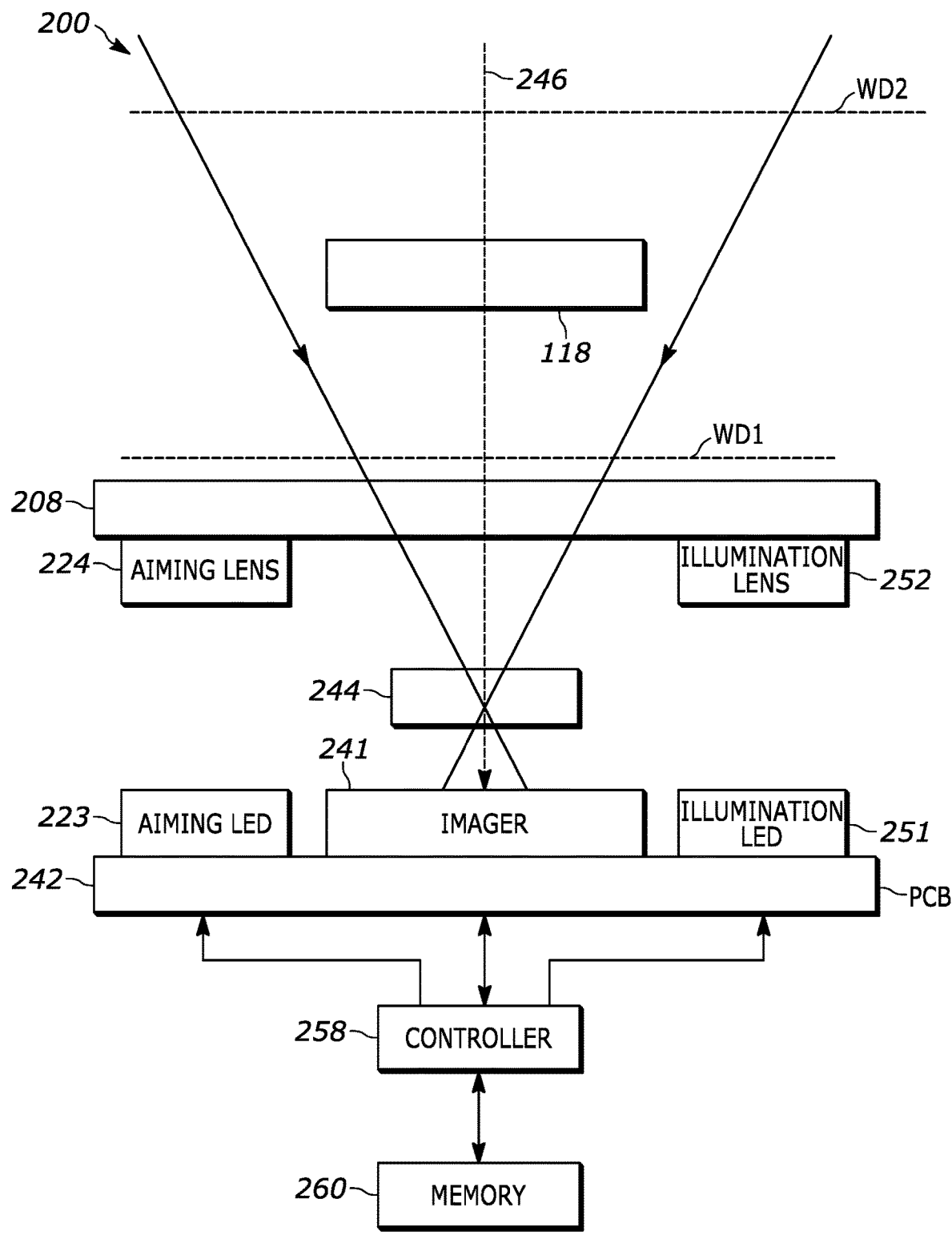
FIG. 2 illustrates a block diagram of an example imaging device such as the example handheld barcode reader of FIG. 1A.

In some embodiments, an imaging assembly includes a light-detecting sensor or imager operatively coupled to, or mounted on, a printed circuit board (PCB) in the handheld imaging device 100 as shown in FIG. 2. In further embodiments, an illuminating light assembly is also mounted in the handheld imaging device 100. The illuminating light assembly may include an illumination light source and at least one illumination lens, configured to generate a substantially uniform distributed illumination pattern of illumination light on and along an object to be read by image capture, as described below with regard to FIG. 2.

As depicted in FIG. 1C, an aiming light assembly is also mounted in the handheld imaging device 100 and includes an aiming light source and an aiming lens for generating and directing a visible aiming light beam away from the handheld imaging device 100 onto the object in the direction of the FOV. The aiming light beam has a cross-section with a pattern, examples of which are shown in FIG. 1C. Generally, in FIG. 1C, there is depicted a handheld imaging device 100, an imaging axis 117, the FOV of the imaging assembly, and an aiming light pattern 125. In the exemplary embodiment of FIG. 1C, the aiming light pattern 125 indicates the center of the FOV, namely the imaging axis 117. In particular, the aiming light pattern 125 bounds or surrounds the imaging axis 117, such that the aiming light is projected parallel to the imaging axis 117, though not colinear with the imaging axis 117. It will further be understood that the cross-sectional patterns depicted in FIG. 1C is not exclusive, and other patterns may be projected onto an imaging plane using the disclosed aim light assembly techniques.

Referring next to FIG. 2, a block diagram of an example architecture for an imaging device such as handheld imaging device 100 is shown. For at least some of the reader implementations, an imaging assembly 245 includes a light-detecting sensor or imager 241 operatively coupled to, or mounted on, a printed circuit board (PCB) 242 in the imaging device 200 as shown in FIG. 2. In an implementation, the imager 241 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging assembly 245 over a field of view along an imaging axis 246 through the window 208. The imager 241 may also include and/or function as a monochrome sensor and, in further implementations, a color sensor. It should be understood that the terms "imager", "image sensor", and "imaging sensor" are used interchangeably herein. Depending on the implementation, imager 241 may include a color sensor such as a vision camera in addition to and/or as an alternative to the monochrome sensor. In some implementations, the imager 241 is or includes a barcode reading module (e.g., a monochromatic imaging sensor). In further implementations, the imager 241 additionally or alternatively is or includes a vision camera (e.g., a color imaging sensor). It will be understood that, although imager 241 is depicted in FIG. 2 as a single block, that imager 241 may be multiple sensors spread out in different locations of imaging device 200.

The return light is scattered and/or reflected from an object 118 over the field of view. The imaging lens 244 is operative for focusing the return light onto the array of image sensors to enable the object 118 to be imaged. In particular, the light that impinges on the pixels is sensed and the output of those pixels produce image data that is associated with the environment that appears within the FOV (which can include the object 118). This image data is typically processed by a controller (usually by being sent to a decoder) which identifies and decodes decodable indicia captured in the image data. Once the decode is performed successfully, the reader can signal a successful "read" of the object 118 (e.g., a barcode). The object 118 may be located anywhere in a working range of distances between a close-in working distance (WD1) and a far-out working distance (WD2). In an implementation, WD1 is about one-half inch from the window 208, and WD2 is about thirty inches from the window 208.

An illuminating light assembly may also be mounted in, attached to, or associated with the imaging device 200. The illuminating light assembly includes an illumination light source 251, such as at least one light emitting diode (LED) and at least one illumination lens 252, and preferably a plurality of illumination and illumination lenses, configured to generate a substantially uniform distributed illumination pattern of illumination light on and along the object 118 to be imaged by image capture. Although FIG. 2 illustrates a single illumination light source 251, it will be understood that the illumination light source 251 may include more light sources. At least part of the scattered and/or reflected return light is derived from the illumination pattern of light on and along the object 118.

An aiming light assembly may also be mounted in, attached to, or associated with the imaging device 200 and preferably includes an aiming light source 223, e.g., one or more aiming LEDs or laser light sources, and an aiming lens 224 for generating and directing a visible aiming light beam away from the imaging device 200 onto the object 118 in the direction of the FOV of the imager 241. It will be understood that, although the aiming light assembly and the illumination light assembly both provide light, an aiming light assembly differs from the illumination light assembly at least in the type of light the component provides. For example, the illumination light assembly provides diffuse light to sufficiently illuminate an object 118 and/or an indicia of the object 118 (e.g., for image capture). An aiming light assembly instead provides a defined illumination pattern (e.g., to assist a user in visualizing some portion of the FOV). Similarly, in some implementations, the illumination light source 251 and the aiming light source 223 are active at different, non-overlapping times. For example, the illumination light source 251 may be active on frames when image data is being captured and the aiming light source 223 may be active on frames when image data is not being captured (e.g., to avoid interference with the content of the image data).

The imaging device 200 is configured to operate in multiple aiming states, as described herein. For example, when operating in a first aiming state, the aiming light assembly (e.g., the light source 223 and/or aiming lens 224) may project a visible aiming light beam such that the aiming light beam appears steady (e.g., always on) to a human eye (e.g., with a duty cycle of more than 30 Hz, more than 60 Hz, etc.). In a second aiming state, the aiming light assembly may instead project the visible aiming light beam such that the light beam appears different to a human observer. For example, the aiming light assembly may project the aiming light beam such that the aiming light beam appears to be flashing between two alternate patterns (e.g., turning off and on) to a user. Additionally, while in the second aiming state, the aiming light assembly may change an aim light pattern of the beam between the first aiming state and the second aiming state (e.g., alternating two partially overlapping rectangles, alternating two triangular patterns, etc.), a color of the beam, etc. In further implementations, the imaging device 200 may additionally emit an auditory cue alongside the visual change, such as a chime, beep, message, etc. In still further implementations, the imaging device 200 may provide haptic feedback to a user alongside the visual change, such as vibration (e.g., a single vibration, vibrating in a predetermined pattern, vibrating synchronized with the flashing, etc.).

Further, the imager 241, the illumination source 251, and the aiming source 223 are operatively connected to a controller or programmed controller 258 (e.g., a microprocessor facilitating operations of the other components of imaging device 200) operative for controlling the operation of these components. In some implementations, the controller 258 functions as or is communicatively coupled to a vision application processor for receiving, processing, and/or analyzing the image data captured by the imager 241.

A memory 160 is connected and accessible to the controller 258. Preferably, the controller 258 is the same as the one used for processing the captured return light from the illuminated object 118 to obtain data related to the object 118. Though not shown, additional optical elements, such as collimators, lenses, apertures, compartment walls, etc. may be provided in the housing. Although FIG. 2 shows the imager 241, the illumination source 251, and the aiming source 223 as being mounted on the same PCB 242, it should be understood that different implementations of the imaging device 200 may have these components each on a separate PCB, or in different combinations on separate PCBs. For example, in an implementation of the imaging device 200, the illumination LED source is provided as an off-axis illumination (i.e., has a central illumination axis that is not co-axial with the central FOV axis).

Figure 3A:
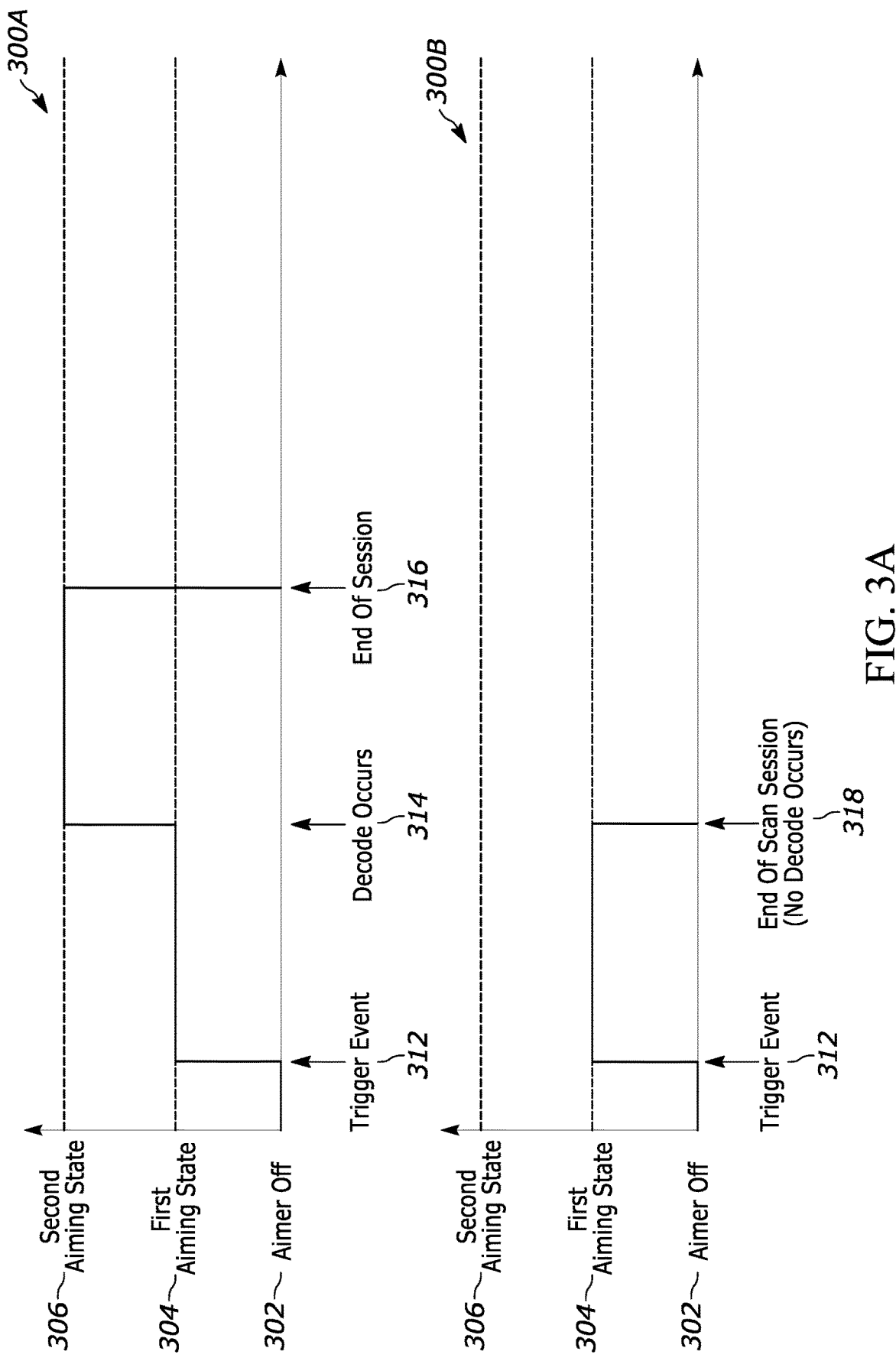
FIG. 3A illustrates state diagrams for an example state change, wherein an imaging device transitions from a first aiming state to a second aiming state when a decode occurs and transitions from the first aiming state to an off state when the decode does not occur.

Referring to FIG. 3A, timing diagrams 300A and 300B depict potential scenarios for an imaging device (e.g., handheld imaging device 100, imaging device 200, etc.) alternating between aiming states. In particular, each timing diagram 300A and 300B depicts an aimer off state 302, a first aiming state 304, and a second aiming state 306. Although the timing diagrams 300A and 300B are described below with regard to imaging device 200 and components thereof as illustrated in FIG. 2, it will be understood that other similarly suitable imaging devices and/or components may be used instead (e.g., with regard to FIG. 1, other imaging devices configured to implement the components and techniques described herein, etc.).

In timing diagrams 300A and 300B, an imaging device 200 begins in an aimer off state 302. Depending on the implementation, the aimer off state 302 may be a state in which an aiming light source 223 of the imaging device 200 is inactive (e.g., not projecting light as described above) while portions of the imaging device 200 (e.g., an imager 241 searching for the presence of an object 118 in the FOV)

remain active. In further implementations, the aimer off state 302 is a state in which the aiming light source 223 of the imaging device 200 and a remainder of the imaging device 200 is also inactive. In still further implementations, the aimer off state 302 is a state in which the aiming light source 223 operates in a low power mode. Similarly, other such aimer off states 302 are envisioned herein.

In response to a trigger event 312, the imaging device moves from an aimer off state 302 to a first aiming state 304. Depending on the implementation, the trigger event 312 may include a physical trigger pull, a button press, a detection by the imaging device 200 (e.g., via the imager 241) that an object 118 enters a FOV, a detection of movement for the imaging device 200 (e.g., being removed from a cradle, detecting movement in the FOV, etc.), an indication to wake up from a computing device, and/or any other such trigger event.

While operating in the first aiming state 304, the imaging device 200 projects (e.g., emits) light via the aiming light source 223. Depending on the implementation, the aiming light source 223 projects light such that the light appears consistent and coherent to an observer (e.g., a human eye). In some cases this may be referred to as having the aiming light source 223 operate at a consistent duty cycle above the flicker fusion threshold. As such, the aiming light source 223 projects light that appears to an observer to be a steady beam. In some such implementations, the aiming light source 223 projects the light by pulsing the light at a high, and preferably consistent, frequency such that the light appears steady to a human (e.g., at 30 Hz, 60 Hz, etc.).

In some implementations, the imaging device 200 operates in the first aiming state 304 until another event occurs. In timing diagram 300A, the additional event is a decode event 314. In such implementations, when the decode event 314 occurs, the imaging device 200 transitions from the first aiming state 304 to a second aiming state 306. When operating in the second aiming state 306, the imaging device 200 projects light via the aiming light source 223 such that the projected light is visually distinct to an observer from the light in the first aiming state. For example, while the light in the first aiming state 304 may appear constant and stable to the human eye, the aiming light from the aiming light source 223 in the second aiming state 306 may instead visibly emit the aiming light according to an inconsistent aim pattern appearance. Put another way, while in the second aiming state 306, the aiming light source 223 may emit light such that the duty cycle of the light alternates and appears inconsistent. For example, the aiming light source 223 may emit light at a duty cycle of 60 Hz for a quarter second before dropping the duty cycle (e.g., dropping the duty cycle to 30 Hz, 20 Hz, 10 Hz, etc. or turning the light off) for a quarter second before repeating the pattern. In further implementations, the duty cycle may change from a duty cycle above the flicker fusion threshold to a duty cycle below the flicker fusion threshold so that an observer sees the aimer flicker after the decode event 314 occurs. In some additional implementations, the aiming light source 223 projects a different aiming light pattern in the second aiming state 306 (e.g., from a circle to a line) in addition to modifying the consistency of the duty cycle for the aim beam. In still further implementations, the imaging device 200 may accompany the visual differences with a noise (e.g., a beep, buzz, voice message, etc.) and/or haptic feedback (e.g., vibrating, buzzing, etc.). It will be understood that the implementations for the second aiming state described above are exemplary, and that other implementations are envisioned. The particular functionality of the aiming light source 223 during the first aiming state 304 and the second aiming state 306 may include additional embodiments, as described below with regard to FIGS. 4-5C.

After the session 316 (and, subsequently, the second aiming state 306) ends, the imaging device 200 may return to an aimer off state 302. In further implementations, the imaging device 200 may instead return to the first aiming state 306. Depending on the implementation, the session may end responsive to a predetermined period of time passing (e.g., a timeout period), an indication from a user, an indication from a computing device, a trigger event, etc. In some implementations, a user may program parameters of the first aiming state 304, second aiming state 306, aimer off state 302, etc. as described below with regard to FIG. 4.

In timing diagram 300B, the imaging device 200 instead remains in the first aiming state 304 until the end of the scan session 318 occurs. In such implementations, no decode event occurs, causing the imaging device 200 to remain in the first aiming state 304. Depending on the implementation, the scan session 318 ends when a timeout occurs (e.g., a predetermined period of time passes), when a user releases a physical trigger, when a user presses a button, upon an indication from another computing device to end the scan session 318, etc.

It will be understood that, although FIG. 3A depicts a first aiming state 304 and a second aiming state 306, additional aiming states are envisioned, as described in detail below with regard to FIGS. 5A-5C. For example, the imaging device 200 may enter into a third aiming state responsive to (i) the successful decode of the decode indicia occurs and a communication error occurs, (ii) the decode indicia is within a predetermined range of a focus limit, (iii) the decode indicia is not centered in the FOV, (iv) the time to decode exceeds a predetermined threshold, (v) the decode indicia is held in a preferred location of the FOV, and/or (vi) any other such potential trigger. In further implementations, the imaging device 200 may go from the first aiming state 302 to a third aiming state, from the second aiming state 304 to a third aiming state, etc.

Figure 3B:
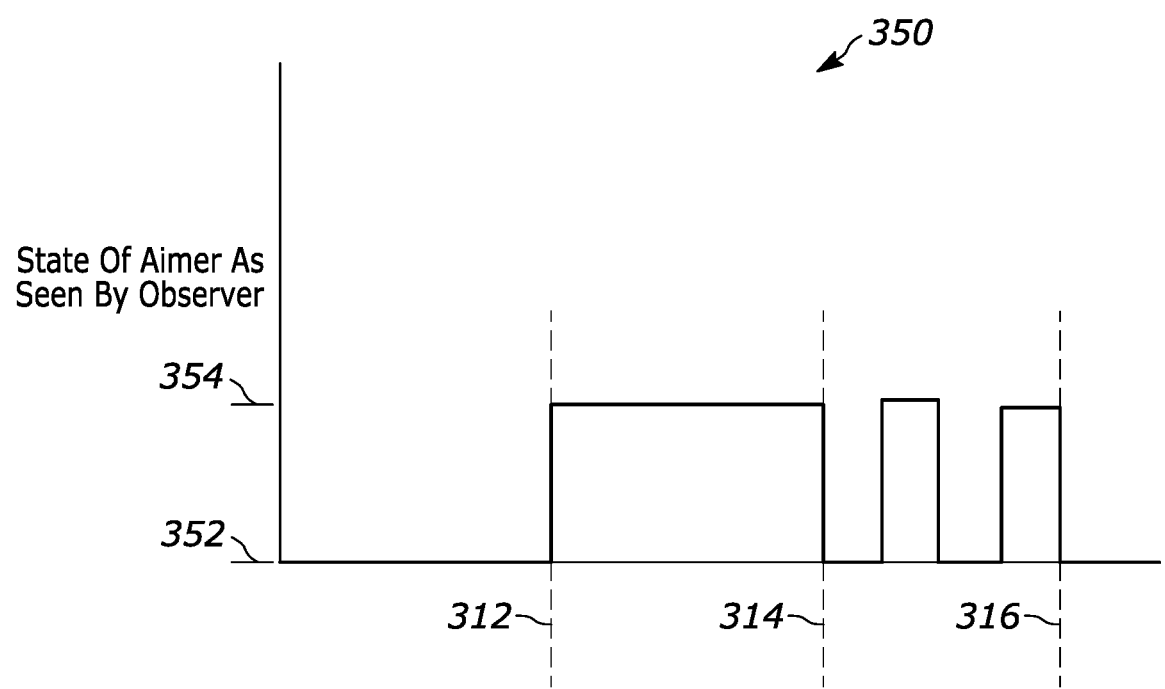
FIG. 3B illustrates a state diagram for an example state change between an on and off state as seen by an observer during a first aiming state and a second aiming state.

Referring next to FIG. 3B, the state diagram 350 depicts a binary state of the aiming light source (e.g., aiming light source 223) as seen by an observer. In particular, before the trigger event 312 occurs, the aiming light source 223 appears to an observer to be consistently in an off state 352. After the trigger event 312 but before a decode event 314 (e.g., during the first aiming state according to timing diagram 300A), the aiming light source 223 appears to an observer to be consistently in an on state 354. It will be understood that, while the state diagram 350 depicts the aiming light source 223 as being in the on state 354, it may only appear as such to an observer (e.g., a human eye or a computerized observer) while actually flickering on and off at a rate faster than the observer can perceive (e.g., greater than 60 Hz). Similarly, the off state 352 may not be fully off, but may be a very slow flicker (e.g., 1 Hz), a low power flicker, a low brightness state, etc. After the decode event 314, the aiming light source 223 enters the second aiming state and visibly alternates between the on state 354 and the off state 352 to an observer.

Figure 4:
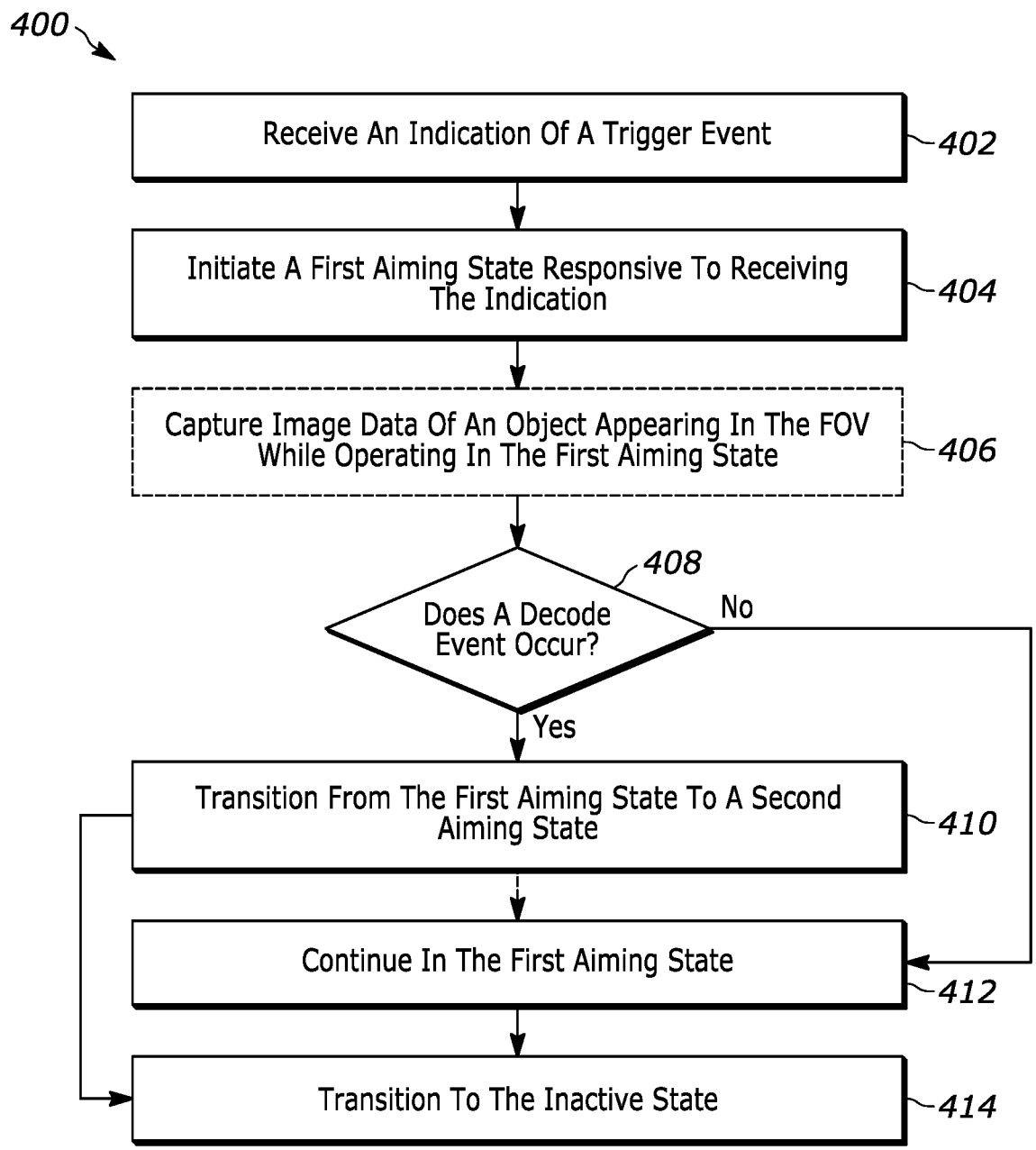
FIG. 4 illustrates a flow diagram of an example method for changing an aim blink pattern when performing a scanning operation, to be implemented in an imaging device such as the handheld barcode reader of FIG. 1A.

Referring next to FIG. 4, the method 400 illustrates a flow diagram of an example method for changing an aim blink pattern when performing a scanning operation. Although the method 400 is described below with regard to imaging device 200 and components thereof as illustrated in FIG. 2, it will be understood that other similarly suitable imaging devices and/or components may be used instead.

At block 402, the imaging device 200 receives an indication of a trigger event. Depending on the implementation, the trigger event may be a physical trigger pull, an indication from a user to wake up the imaging device 200, a presence of an object 118 within a FOV of the imaging device, detected movement of the imaging device 200, and/or any other such potential trigger event. In some implementations, the trigger event may include transmitting one or more frames captured by the imaging device 200 to an ASIC that functions as a decode or image analysis module. When the ASIC detects that an object is present, the imaging device 200 may cause the wakeup to occur and transition to a first aiming state at block 404.

At block 404, the imaging device 200 initiates a first aiming state responsive to receiving the indication at block 402. In some implementations, during the first aiming state, an aiming light source (e.g., aiming light source 223) of the imaging device 200 projects light as an aim pattern such that the light appears steady to the human eye (e.g., 30 Hz, 60 Hz, etc.). In some preferred embodiments, the aiming light source 223 projects light at a duty cycle and intensity such that the light stays below a safety threshold, such as those set by a regulatory and/or governing body. In some implementations, the aiming light source 223 projects the light by alternating a standard, bright light, and a dimmer light to safely project light. Further, imaging devices designed for close up use that may have dimmer lights may increase a duty cycle or increase the brightness of the light during the second aiming state.

Depending on the implementation, the light projected by the aiming light source in the first aiming state may be a red light (e.g., light with a wavelength between 620 nanometers and 750 nanometers, a light with a wavelength of 660 nanometers, etc.), a green light (e.g., light with a wavelength between 495 nanometers and 565 nanometers, a light with a wavelength between 515 nanometers to 525 nanometers, etc.), a substantially white light, and/or any other such light color. Depending on the implementation, a green light may be preferred for the second aiming state compared to a red light, as a green light may be associated with a positive state and, as such, providing an indication that a user successfully scanned an object may be more effective using such. Further, a green light may be more readily visible and therefore detectable to a human user. As such, implementations in which the light is a green light may provide an advantage over other implementations insofar as an observer may more quickly and/or easily detect that a change in aiming state has occurred.

In further implementations, a user may configure the first aiming state. In some implementations, the user may configure the aiming state by inputting parameters (e.g., a color, duty cycle, intensity, etc.) into the imaging device 200. In further implementations, the user configures the aiming state by way of a computing device communicatively coupled to the imaging device 200 (e.g., inputting parameters into the computing device). In still further implementations, the user configures the aiming state by scanning a decode indicia that causes the imaging device 200 to configure the parameters for the first aiming state. In yet still further implementations, the imaging device 200 is programmed with a default set of parameters for the first aiming state. Depending on the implementation, the parameters may include (i) a flash pattern type, (ii) a duty cycle length, (iii) a brightness of the light, (iv) a flash pattern duration, (v) a color of the light, or (vi) any other such parameter for the aiming state. For example, the flash pattern type may be a particular shape or pattern of the aim light (e.g., a square, a circle, a triangle, overlapping rectangles, etc.). Similarly, the flash pattern duration and/or duty cycle length may be a particular time period (e.g., a quarter second, half second, second, etc. for the duty cycle length; a second, two seconds, five seconds, etc. for a flash pattern duration). The brightness of the light and/or color of the light may be limited by various components of the device (e.g., only green wavelengths may be available, only a predetermined range of brightness may be available, etc.).

At block 406, the imaging device 200 may capture image data of an object (e.g., object 118) appearing in the FOV while operating in the first aiming state. Depending on the implementation, the imaging device 200 may capture image data of the object 118 on frames where the aim pattern is not visible (e.g., on "off" frames of the duty cycle). In some such implementations, the imaging device 200 captures image data on frames where the aim pattern is not visible while operating in some modes (e.g., a decode mode) and captures imaging data on frames where the aim patter is visible while operating in other modes (e.g., a ranging or picklist mode).

At block 408, the imaging device 200 determines whether a decode event occurs. If so, then flow proceeds to block 410. If a decode event does not occur, then flow proceeds instead to block 412. In some implementations, a decode event occurs when a decode module of the imaging device 200 receives a captured image, determines that a decode indicia is present, and/or successfully decodes the decode indicia. In further implementations, a decode event occurs when the imaging device 200 captures an image and determines that a decode indicia is visible enough for a decode to successfully occur.

At block 410, the imaging device 200 transitions from the first aiming state to a second aiming state. The second aiming state differs from the first aiming state visually in at least the duty cycle consistency of the light from the aiming light source 223. For example, in some implementations, the aiming light source 223 projects a light that appears substantially consistent and/or stable to an observer such as the human eye (e.g., no flickering seems to occur) during the first aiming state. In the second aiming state, however, the aiming light source 223 may visibly cause the duty cycle to alternate (e.g., move between 60 Hz for a period of time and 30 Hz, 20 Hz, 10 Hz, 0 Hz, etc. for a period of time) and/or otherwise flicker (e.g., with a frequency of less than 60 Hz, with a frequency of less than 30 Hz, with a frequency of less than 15 Hz, etc.), flash, change brightness, etc. In further implementations, in the second aiming state, the aiming light source 223 may perform another visible effect in addition to the change in duty cycle consistency, such as changing or alternating an aim light pattern (e.g., from a dot with a line on either side to a dot with no lines or a dot with lines above and below), changing or alternating aim light color, etc. In still further implementations, in the second aiming state, the visual changes may be accompanied by an auditory effect, such as a beep, a buzz, a confirmation voice message, etc. Similarly, in further implementations, the visual changes in the second aiming state may additionally or alternatively be accompanied by haptic feedback, such as vibrations (e.g., at a frequency matching the duty cycle changes of the aiming light source 223).

Depending on the implementation, the second aiming state may last for a predetermined period of time and/or for a predetermined number of duty cycle change repetitions (e.g., on-off cycles, bright-dim cycles, etc.). For example, the second aiming state may last for three cycle changes, fewer than five cycle changes, a single short, long, short cycle change pattern, etc. so as to alert a user of a successful scan without becoming distracting or potentially hazardous to the health of the operator. Additionally or alternatively, the second aiming state may last for 1 second, 2 seconds, 5 seconds, 10 seconds, 30 seconds, etc. In further implementations, the user may program the second aiming state similarly to the first aiming state, as described above. After the second aiming state is complete (e.g., the predetermined period of time elapses or is cancelled), in some implementations, the flow then proceeds to block 412. In further implementations, the flow instead proceeds directly to block 414.

At block 412, the imaging device 200 continues in the first aiming state. In some implementations, the imaging device 200 continues in the first aiming state by remaining in the first aiming state when the imaging device 200 does not perform a decode event (e.g., block 408, "no" path). In further implementations, the imaging device 200 continues in the first aiming state by transitioning back to the first aiming state, such as from the second aiming state. For example, after detecting a decode indicia in the FOV, the imaging device 200 may transition from the first aiming state to the second aiming state. After the second aiming state ends, the imaging device 200 may then transition back to the first aiming state to await a new decode event, a timeout, a user indication, etc.

At block 414, the imaging device 200 transitions to the inactive state. In some implementations, the imaging device 200 exits the first aiming state after a predetermined timeout period (e.g., a timeout event occurs), upon determining to enter the second state again, upon determining to enter a third state (e.g., as described below with regard to FIGS. 5A-5C), upon receiving an indication of a trigger event end (e.g., a user releases a physical trigger or button on the imaging device 200), and/or upon otherwise receiving an indication to end the first aiming state as described herein. In further implementations, the imaging device 200 transitions straight from the second aiming state to the inactive state instead. For example, the imaging device 200 may, while in the first aiming state, detect an object with a decode indicia and enter the second aiming state by flashing the aiming light source 223 according to a predetermined pattern. The imaging device 200 may then cause the aiming light source 223 to cease projecting light, entering into an inactive state. Depending on the implementation, the inactive state may be an inactive aiming state (e.g., where the aiming light source 223 is off but other portions of the imaging device 200 are on), an inactive device state (e.g., where the imaging device 200 turns off entirely), or some other such inactive state as described herein. For example, in the inactive state, the imaging device 200 may continue searching for a wakeup event (e.g., an object 118 entering a FOV, a physical trigger pull, movement of the imaging device 200, etc.) in a low-power mode as an inactive state or the imaging device 200 may turn off entirely as an inactive state.

In some implementations, the imaging device 200 may be communicatively coupled to another imaging device (e.g., a camera), configured to detect the change from the first aiming state to the second aiming state. In some such implementations, the additional imaging device transmits an indication of whether the change to the second aiming state occurred and the imaging device 200 determines whether a scan avoidance event occurred based on the indication.

Figure 5A:
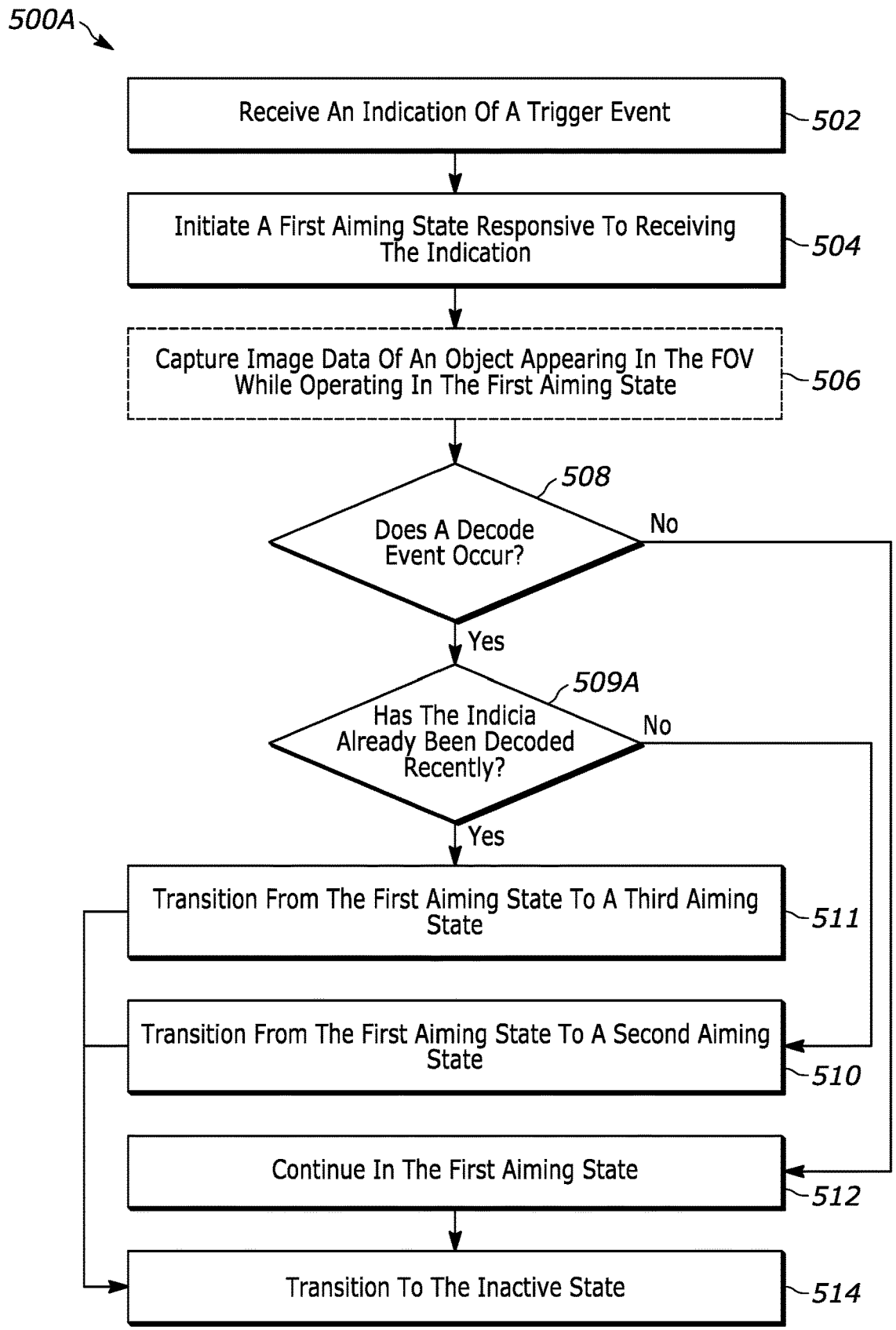
FIG. 5A illustrates a flow diagram of an example method similar to that of FIG. 4, but in which the imaging device transitions from the first aiming state to a third aiming state when the indicia has been recently decoded.

Referring next to FIG. 5A the method 500A illustrates a flow diagram of another example method similar to method 400, but in which the imaging device transitions from the first aiming state to a third aiming state when the indicia has been recently decoded. As such, similarly numbered blocks may occur according to similar implementations as with the corresponding block of FIG. 4. For example, blocks 502, 504, 506, 508, 510, 512, and/or 514 may occur similarly to blocks 402, 404, 406, 408, 410, 412, and/or 414, respectively. Although the method 500A is described below with regard to imaging device 200 and components thereof as illustrated in FIG. 2, it will be understood that other similarly suitable imaging devices and/or components may be used instead.

At block 509A, the imaging device 200 determines whether the same decode indicia has already been decoded recently (e.g., within a predetermined time period). Depending on the implementation, the imaging device 200 may therefore enter the second aiming state to indicate to a user that an object 118 has been successfully scanned and decoded and may proceed to block 511 and enter a third aiming state to indicate that the object 118 has been scanned twice. In some implementations, the predetermined time period is a default time period or is a time period entered by the user as described above (e.g., by entering parameters in the imaging device 200, by entering parameters via a computing device, by scanning a parameter barcode, etc.). Depending on the implementation, the predetermined time period may be 500 milliseconds, 1 second, 5 seconds, etc.

At block 511, the imaging device 200 transitions from the first aiming state to a third aiming state different than the first and second aiming states. Depending on the implementation, the third aiming state may be similar to the second aiming state, though still different. For example, if the second aiming state is a single duty cycle change to indicate a first scan, the third aiming state may include two duty cycle changes to indicate a second scan during the period. In further implementations, the third aiming state may include further changes to differentiate from the second aiming state. For example, the second aiming state may be a single duty cycle change while the third aiming state may include a duty cycle change and a noise. As another example, the imaging device 200 may enter the second aiming state and flash twice to indicate a successful decode and may enter the third aiming state and begin repeatedly flashing for 10 seconds to indicate that the user accidentally scanned the object 118 twice.

It will be understood that, although a third aiming state is described above, that the imaging device 200 may be configured to operate in any number of aiming states. For example, the imaging device 200 may transition from the first aiming state to the second aiming state, then back to the first aiming state. The imaging device 200 may then transition from the first aiming state to the third aiming state, then back to the first aiming state. The imaging device 200 may continue transitioning to other aiming states or to repeat aiming states as described herein.

Figure 5B:
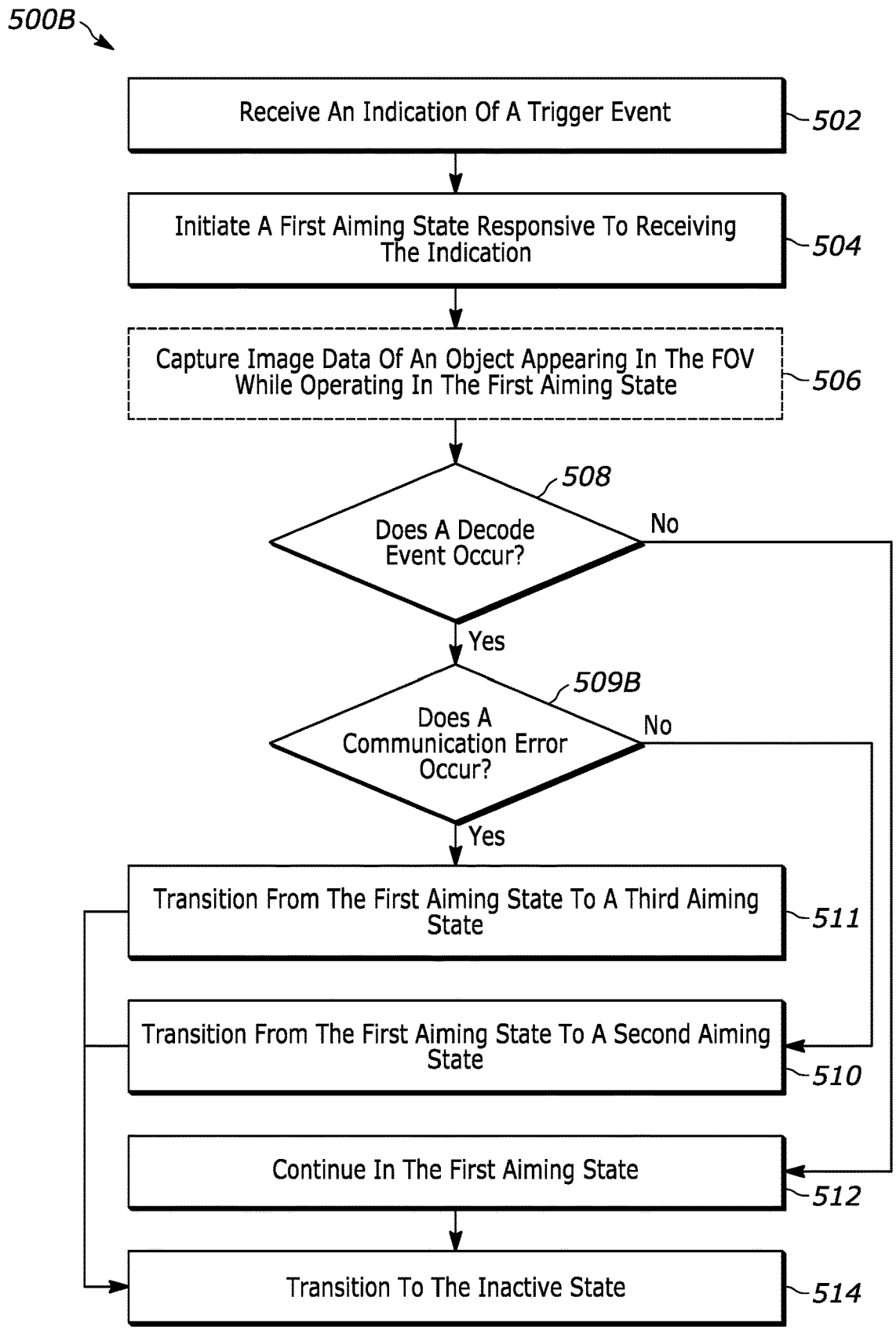
FIG. 5B illustrates a flow diagram of an example method similar to that of FIG. 5A, but in which the imaging device transitions to the third aiming state when a communication error occurs.

Referring next to FIG. 5B the method 500B illustrates a flow diagram of another example method similar to method 500A, but in which, at block 509B, the imaging device 200 determines whether a communication has occurred. If so, then flow continues to block 511 and the imaging device 200 transitions to the third aiming state similar to the third aiming state as described with regard to FIG. 5A. For example, if the decode occurred but the imaging device 200 was unable to communicate the decode event to a computing device, then the imaging device 200 enters the third aiming state to indicate that the decode was successful, but the system did not register the decode due to a communication error. Otherwise, if not, then the flow continues to block 510.

Figure 5C:
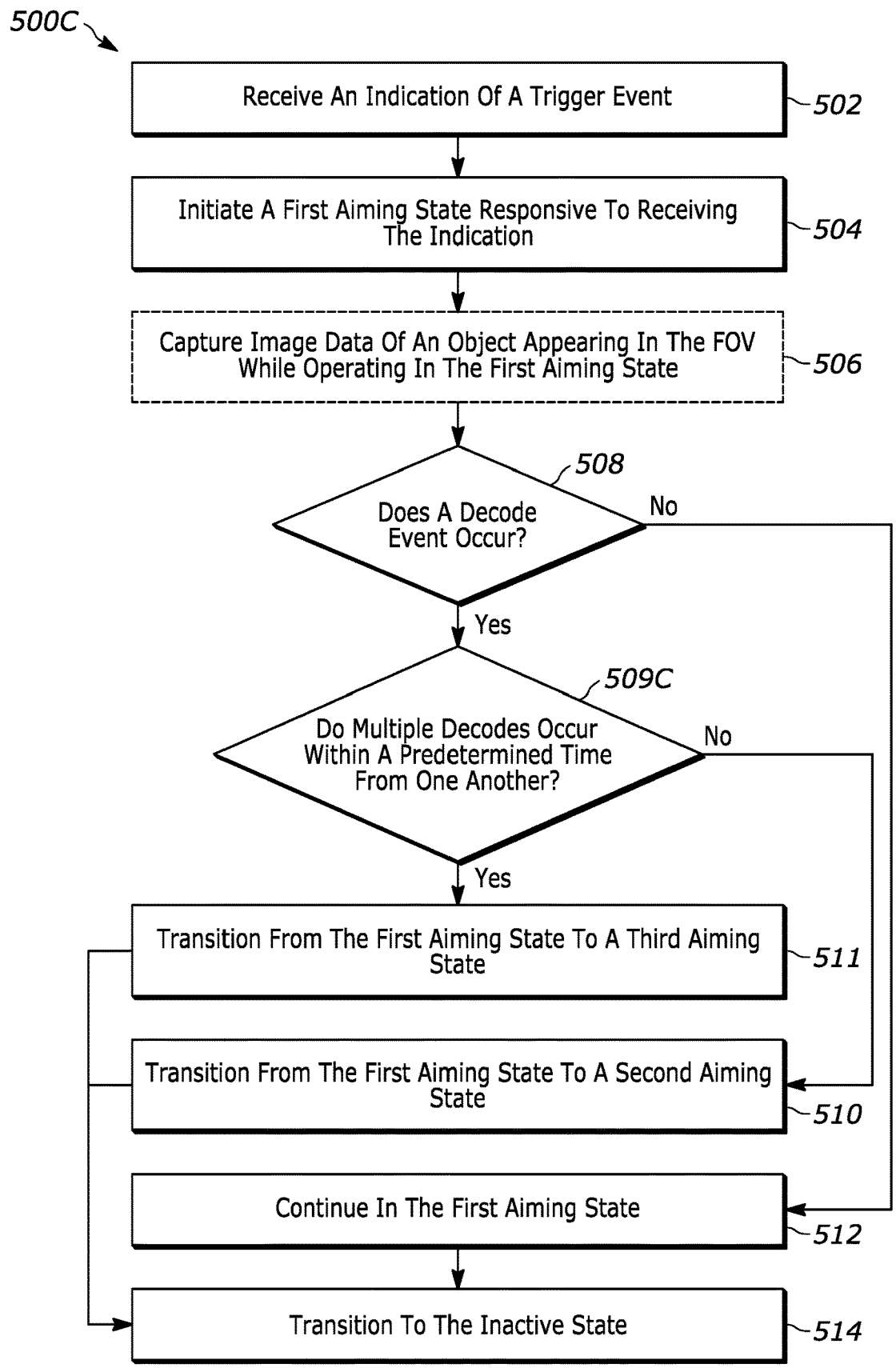
FIG. 5C illustrates a flow diagram of an example method similar to that of FIG. 5A, but in which the imaging device transitions to the third aiming state when multiple decode events occur within a predetermined time period.

Referring next to FIG. 5C the method 500C illustrates a flow diagram of another example method similar to method 500A and/or 500B, but in which, at block 509C, the imaging device 200 determines whether multiple decode events occur within a predetermined time from one another. If so, then flow continues to block 511 and the imaging device 200 transitions to the third aiming state as described with regard to FIG. 5A. For example, the second aiming state may be a single flash and the third aiming state may be multiple flashes to indicate a series of scanned items. Otherwise, if not, then the flow continues to block 510.

Depending on the implementation, the imaging device may transition to the third aiming state when (i) the successful decode of the decode indicia occurs and a communication error occurs, (ii) the decode indicia is within a predetermined range of a focus limit, (iii) the decode indicia is not centered in the FOV, (iv) the time to decode exceeds a predetermined threshold, (v) the decode indicia is held in a preferred location of the FOV, or (vi) any other such trigger event occurs. As such, it will be understood that the third aiming states described above and with regard to FIGS. 5A-5C are not an exhaustive list of triggers for the imaging device 200 to enter a third aiming state, but are rather exemplary for the sake of brevity. Additional or alternative triggers are envisioned, including combinations of the above triggers and/or alternative triggers. For example, a 2D code such as a GS1 barcode or QR code may cause the imaging device 200 to enter the third aiming state and a 1D standard barcode may cause the imaging device 200 to enter the second aiming state.

Embodiments of the present disclosure may have certain advantages over traditional approaches. For example, using a single assembly to provide both aiming light and a decode indication can reduce complexity, footprint, costs, etc. Similarly, providing a visible decode indication using the aiming light may improve a rate at which users recognize the indication, as auditory cues may be missed in a noisy or busy environment and an illumination system has a large FOV across which the system projects light, diffusing the light and reducing overall visibility.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An imaging device, comprising:
an imaging assembly configured to capture image data of an object appearing in a field of view (FOV);
an aiming assembly including a light source configured to emit light with a wavelength in a range of 495 nanometers to 565 nanometers; and
a computer-readable media storing machine readable instructions that, when executed, cause the imaging device to:
  initiate, at the aiming assembly, a first aiming state responsive to receiving an indication of a trigger event;
  capture, via the imaging assembly, the image data of the object appearing in the FOV while operating in the first aiming state, wherein the image data of the object is representative of an environment appearing in the FOV and includes data associated with an indicia present in the FOV;
  transition, at the aiming assembly, from the first aiming state to a second aiming state responsive to a successful decode event associated with the indicia, wherein the light source is to emit light in the second aiming state such that an observable appearance of the light in the FOV is different in the second aiming state than in the first aiming state; and otherwise refrain from transitioning, at the aiming assembly, from the first aiming state to the second aiming state.

2. The imaging device of claim 1, wherein the aiming assembly emits light in each of the first aiming state and the second aiming state using same optical elements.

3. The imaging device of claim 1, wherein the computer-readable media further stores additional instructions that, when executed, cause the imaging device to:

transition, at the aiming assembly, to an inactive aiming state after a timeout event.

4. The imaging device of claim 1, wherein the image data of the object is object image data, the indicia is an object indicia representative of the object, and the computer-readable media further stores additional instructions that, when executed, cause the imaging device to:

capture, via the imaging assembly, parameter image data including a parameter indicia;

decode the parameter indicia; and modify one or more operation parameters of the light source during the second aiming state based on the parameter indicia.

5. The imaging device of claim 4, wherein the one or more operation parameters of the light source includes at least one of: (i) a flash pattern type; (ii) a duty cycle length; (iii) a brightness of the light source; (iv) a flash pattern duration; or (v) a color of the light emitted by the light source.

6. The imaging device of claim 1, wherein transitioning from the first aiming state to the second aiming state includes:

maintaining at least a consistent color and aim pattern between the first aiming state and the second aiming state.

7. The imaging device of claim 1, wherein the computer-readable media further stores additional instructions that, when executed, cause the imaging system to:

transition, at the aiming assembly, to a third aiming state when at least one of: (i) the successful decode event occurs and a communication error occurs, (ii) the indicia is within a predetermined range of a focus limit, (iii) the indicia is not centered in the FOV, (iv) the time to decode exceeds a predetermined threshold, (v) the indicia is held in a predetermined location of the FOV, or (vi) the indicia is held outside of the predetermined location of the FOV, wherein the light source is to emit light in the third aiming state such that an observable appearance of the light in the FOV is different in the third aiming state than in the second aiming state and the first aiming state.

8. The imaging device of claim 1, wherein the computer-readable media further stores additional instructions that, when executed, cause the imaging system to:

transition, at the aiming assembly, from the second aiming state to the first aiming state after a timeout event occurs.

9. The imaging device of claim 1, wherein the transition to the inactive aiming state includes a transition from the second aiming state to the inactive aiming state.

10. The imaging device of claim 1, wherein the computer-readable media further stores additional instructions that, when executed, cause the imaging system to:

provide haptic feedback at a frequency matching a change in duty cycle of the light source of the aiming assembly while in the second aiming state.

11. A method for managing aiming states of an imaging device, the method comprising:

initiating, at an aiming assembly including a light source configured to emit light with a wavelength in a range of 495 nanometers to 565 nanometers, a first aiming state responsive to receiving an indication of a trigger event;

capturing, via an imaging assembly configured to capture image data of an object appearing in a field of view (FOV), the image data of the object appearing in the FOV while operating in the first aiming state, wherein the image data of the object is representative of an environment appearing in the FOV and includes data associated with an indicia present in the FOV;

transitioning, at the aiming assembly, from the first aiming state to a second aiming state responsive to a successful decode event associated with the indicia, wherein the light source is to emit a consistent light pattern in the first aiming state and an altering light pattern in the second aiming state;

otherwise refraining from transitioning, at the aiming assembly, from the first aiming state to the second aiming state.

12. The method of claim 11, wherein the aiming assembly emits light in each of the first aiming state and the second aiming state using same optical elements.

13. The method of claim 11, further comprising:

transitioning, at the aiming assembly, to an inactive aiming state after a timeout event.

14. The method of claim 11, wherein the image data of the object is object image data, the indicia is an object indicia representative of the object, and the method further comprises:

capturing, via the imaging assembly, parameter image data including a parameter indicia;

decoding the parameter indicia; and modifying one or more operation parameters of the light source during the second aiming state based on the parameter indicia.

15. The method of claim 14, wherein the one or more operation parameters of the light source includes at least one of: (i) a flash pattern type; (ii) a duty cycle length; (iii) a brightness of the light source; (iv) a flash pattern duration; or (v) a color of the light emitted by the light source.

16. The method of claim 11, wherein transitioning from the first aiming state to the second aiming state includes:

maintaining at least a consistent color and aim pattern between the first aiming state and the second aiming state.

17. The method of claim 11, further comprising:

transitioning, at the aiming assembly, to a third aiming state when at least one of: (i) the successful decode event occurs and a communication error occurs, (ii) the indicia is within a predetermined range of a focus limit, (iii) the indicia is not centered in the FOV, (iv) the time to decode exceeds a predetermined threshold, (v) the indicia is held in a predetermined location of the FOV, or (vi) the indicia is held outside of the predetermined location of the FOV, wherein the light source is to emit light in the third aiming state such that an observable appearance of the light in the FOV is different in the third aiming state than in the second aiming state and the first aiming state.

18. The method of claim 11, further comprising:

transitioning, at the aiming assembly, from the second aiming state to the first aiming state after a timeout event occurs.

19. The method of claim 11, wherein the transitioning to the inactive aiming state includes transitioning from the second aiming state to the inactive aiming state.

20. The method of claim 11, further comprising:
providing haptic feedback at a frequency matching a change in duty cycle of the light source of the aiming assembly while in the second aiming state.

21. The method of claim 11, wherein the altering pattern alternates between a first pattern and a second pattern at a frequency of less than or equal to 20 Hz.

22. The method of claim 21, wherein, for the first pattern, the light source emits the consistent pattern and, for the second pattern, the light source is inactive.

23. The method of claim 21, wherein a duty cycle of the light source during the first aiming state is greater than or equal to 30 Hz.

24. The method of claim 11, further comprising:
receiving, from a camera system, an indication of whether the transition from the first aiming state to the second aiming state occurred; and
determining, based at least on the indication of whether the transition from the first aiming state to the second aiming state occurred, whether a scan avoidance event occurs.

\* \* \* \* \*